United States Patent
Lindquist et al.

(10) Patent No.: US 7,013,141 B2
(45) Date of Patent: Mar. 14, 2006

(54) METHOD OF RANKING NEIGHBOR CELLS AS CANDIDATES FOR AN HAND OVER

(75) Inventors: Thomas L. Lindquist, Mölndal (SE); Jan A. Milén, Nacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 9 days.

(21) Appl. No.: 10/482,783

(22) PCT Filed: Jul. 3, 2001

(86) PCT No.: PCT/SE01/01528

§ 371 (c)(1),
(2), (4) Date: Mar. 29, 2004

(87) PCT Pub. No.: WO03/005759

PCT Pub. Date: Jan. 16, 2003

(65) Prior Publication Data

US 2004/0235478 A1    Nov. 25, 2004

(51) Int. Cl.
*H04Q 7/20* (2006.01)
*H04Q 7/00* (2006.01)

(52) U.S. Cl. .................... 455/435.1; 455/436; 370/329
(58) Field of Classification Search ............... 455/440, 455/446, 439, 436, 435.1, 437, 442
See application file for complete search history.

(56) References Cited

U.S. PATENT DOCUMENTS

| 5,432,843 A | * | 7/1995 | Bonta .......................... 455/438 |
|---|---|---|---|
| 5,623,535 A | * | 4/1997 | Leung et al. ................. 455/444 |
| 5,740,535 A | * | 4/1998 | Rune .......................... 455/437 |
| 5,768,267 A | * | 6/1998 | Raith et al. .................. 370/329 |
| 5,854,981 A | * | 12/1998 | Wallstedt et al. ............ 455/439 |
| 5,907,807 A | * | 5/1999 | Chavez, Jr. et al. ......... 455/436 |
| 5,915,221 A | * | 6/1999 | Sawyer et al. .............. 455/437 |
| 6,097,953 A | * | 8/2000 | Bonta et al. ................. 455/436 |
| 6,112,089 A | | 8/2000 | Satarasinghe |
| 6,119,005 A | | 9/2000 | Smolik |
| 6,285,874 B1 | * | 9/2001 | Magnusson et al. ...... 455/456.1 |
| 6,360,098 B1 | * | 3/2002 | Ganesh et al. .............. 455/436 |
| 6,421,328 B1 | * | 7/2002 | Larribeau et al. ........... 370/329 |

FOREIGN PATENT DOCUMENTS

| EP | 0849967 | 6/1998 |
|---|---|---|
| WO | 98/36588 | 8/1998 |
| WO | 01/17293 | 3/2001 |
| WO | 0120942 | 3/2001 |

* cited by examiner

*Primary Examiner*—William Trost
*Assistant Examiner*—Kiet Doan
(74) *Attorney, Agent, or Firm*—Nixon & Vanderhye P.C.

(57) ABSTRACT

The present invention is related to cellular radio communication network and a method and apparatus for ranking a set of neighbor cells associated with a first cell in the cellular radio communication network. For each cell member in said neighbor cell set, handover statistics reflecting how frequent said cell member is involved in handovers aiming at modifying active sets including at least said first cell to include said cell member are registered (301). Based at least in part on the registered handover statistics for the different cell members in the set of neighbor cells, the cell members of said set of neighbor cells are ranked (302). The invention also includes a method for controlling mobile station measurements wherein neighbor cells are selected for inclusion in a monitored set based on said ranking.

27 Claims, 6 Drawing Sheets

METHOD OF RANKING NEIGHBOR CELLS AS CANDIDATES FOR AN HAND OVER

This application is the US national phase of international application PCT/SE01/01528 filed Jul. 3, 2001, which designated the US, the contents of which are incorporated herein by reference.

TECHNICAL FIELD OF THE INVENTION

The present invention relates to a cellular radio communication network and methods and an apparatus in the cellular radio communication network. More in particular, the invention relates to a method and apparatus for ranking of neighbor cell sets in the radio communication network and a radio communication network including said apparatus. The invention also includes a method of controlling mobile station measurements.

DESCRIPTION OF RELATED ART

In a typical cellular radio communication system, a geographical area served by a cellular radio communication network is divided into cell areas in which radio base stations, also sometimes referred to as base transceiver stations, provide radio coverage to mobile stations operating in said cell areas. The mobile stations, which e.g. may be portable, pocket, hand-held or car mounted, enables mobile station users (mobile subscribers) to communicate voice, data and/or multimedia information via the cellular radio communication network. Each radio base station may be equipped to service one or more cells.

A mobile station may be assigned a radio communication channel dedicated for communication between the mobile station and the cellular network e.g. when receiving or making a phone call. In traditional cellular radio communication systems, such as e.g. Global System for Mobile communication (GSM), Personal Digital Cellular (PDC) and Digital Advanced Mobile Phone System (DAMPS), the dedicated radio communication channel is served by a single cell referred to as the serving cell. During the phone call it may become necessary to serve the call using another cell e.g. due to the mobile station moving into an other cell. A new dedicated radio communication channel is then established in the other cell for serving the phone call, while the old dedicated radio communication channel is released. This process of changing dedicated radio communication channels during an ongoing call is referred to as handoff or handover. Due to there being a short interruption of communication as the mobile station switches from one dedicated radio communication channel to another, this type of handover is sometimes referred to as hard handover or "break before make".

In more recent cellular radio communication systems using so called Code Division Multiple Access (CDMA) technology, e.g. IS-95 and the UTRAN FDD mode (also referred to as Wideband CDMA), a dedicated radio communication channel need not only be supported by a single serving cell at each given moment of time, but may on the contrary be supported by several cells using so called macrodiversity which provides increased radio transmission quality. The set of cells currently serving the dedicated communication channel is referred to as the Active Set. Due to the possibility of using more than one cell to serve a dedicated radio communication channel, these cellular radio communication systems also enables so called soft handover, sometimes referred to as "make before break", wherein the mobile station continues to communicate with the cellular network via the old cell at least until the dedicated radio channel is established also in the new cell.

In order to support handover, both in traditional systems and systems using CDMA, mobile stations are required to perform measurements on downlink transmissions, i.e. from the cellular network to the mobile stations, in both the serving cell/Active Set as well as neighboring cells to the serving cell/Active Set. The measurement results are reported back to the cellular network and are used for making decisions on which cell is best suited to serve the respective mobile station.

The mobile stations have limited capacity for performing the downlink measurements, thus if a mobile station is ordered to perform downlink measurements on transmissions in too many cells, the quality, and thereby the reliability of the measurements reported to the network, is reduced and/or it takes longer time to produce measurement results which e.g. may cause a loss of communication in a situation where the radio environment changes quickly such as when the mobile station turns around a street corner at high speed. On the other hand, if not all neighbor cells to the serving cell/Active Set are measured, there is a risk that the most suitable cell, i.e. the cell where communication between the mobile station and cellular network can be maintained using minimum radio transmission power, is never considered as a candidate for handover. To be able to use minimum transmission power for maintaining communication is important since this way battery operated mobile stations can operate for longer periods of time without having to be recharged. To be able to use minimum transmission power is also very important in so called interference limited systems, such as systems based on CDMA-technology, wherein using minimum transmission power causes reduced interference levels which translates into improved system capacity.

Since when employing macrodiversity/soft handover, the Active Set serving a mobile station may include several cells, e.g. up to 6 cells in UTRAN FDD mode, which each has a plurality of neighbor cells, the above illustrated problem of the number of neighbor cells associated with cells in an active set exceeding the number of neighbor cells for which mobile stations have adequate capacity to perform downlink measurement appears frequently in cellular communication systems employing CDMA-technology, in particular if such systems also provide the possibility for handover to neighbor cells on other frequencies and/or neighbor cells based on other radio access technologies.

In current UMTS Radio Access Networks based on the FDD mode, a known way of handling a situation where there are too many neighbor cells associated with an Active Set supporting communication between a mobile station and the radio access network, is to order the mobile station to perform measurements on an arbitrary selection of said neighbor cells.

Published international patent application WO 98/36588 describes a method and apparatus in a code division multiple access (CDMA) communication system for merging pilot neighbor lists to form a Neighbor List Update message for transmission to a mobile station operating in the CDMA-system. The mobile station measures pilot signal strengths and phase delays received at the mobile station. The mobile station communicates the signal strengths and phase delays of all pilot signals in the so called Active Set and (optionally) Candidate Set to a Mobile Telephone Switching Office (MTSO) in the CDMA-system. The MTSO retrieves predetermined neighbor lists of all Active/Candidate set pilots reported by the mobile station and generates a neighbour list union as the union of the predetermined neighbor lists. Any member in the neighbor list union included in the Active/Candidate set reported by the mobile station is removed and each remaining member, or base station, in the neighbor list union is operated on by a weighting function which takes into account how often each member is included in the predetermined neighbor lists of the reported Active/Candidate set pilots and the signal strength of such pilots. The relative weight are then sorted and the highest ranking members form a Neighbor List Update Message, up to a predetermined number of members.

U.S. Pat. No. 6,119,005 discloses a method and system for automated determination of handoff neighbor lists for base stations in a Code Division Multiple Access (CDMA) system. Mobile subscriber units operating in the CDMA-system produces Pilot Strength Measurement (PSM) data that is indicative of the relative signal strength measured at the mobile subsriber units from a plurality of pilot channels transmitted by base stations in the CDMA-system. The mobile subscriber units transmit this data along with a list of viable pilot channel candidates as determined by the mobile subscriber units, to the base stations serving the respective calls. For each base station in the CDMA-system, the system for automated determination of handoff neighbor list maintains a data structure that stores data indicative of the number of instances that a pilot channel is recommended as a viable candidate by mobile subscriber units involved in calls served by the base station and the sum of power levels that were measured by the various mobile subscriber units for these instances. This data is processed to determine a metric for each pilot channel entry in the data structure data, said metric being a function of the number of instances that the pilot channel is recommended multiplied by a weighting factor summed with the sum of power levels. Based on the determined metric values, the pilot channel entries are rank ordered and the resultant list is truncated to a predetermined number of entries forming an updated Neighbor List for the base station at hand.

Published international patent application WO 01/17293 teaches a method and an arrangement in a cellular radio communication network for preparing a measurement order list for transmission to a mobile station operating in a first cell. According to the disclosed method, it is determined whether at least one cell among the neighbouring cells to the first cell is incapable of acting as a target for handoff of the mobile station. If at least one cell incapable of acting as a target for handoff is found, at least one control channel associated with such a cell is omitted when generating said list by including control channels associated with neighbouring cells.

SUMMARY OF THE INVENTION

The problem dealt with by the present invention is to provide conditions for increasing the probability that the most suitable cells are included in an Active Set supporting communication between a cellular radio communication network and a mobile station.

The problem is solved essentially by a method of ranking sets of neighbor cells based at least in part on how frequent each neighbor cell member is involved in handovers and a method of controlling measurements which accounts for the ranking established using the inventive method for ranking. The invention also includes an apparatus implementing the method of ranking and a cellular radio communication network including such an apparatus.

An advantage afforded by the invention is that it provides conditions for increasing the probability that the most suitable cells are included in an Active Set supporting communication between a cellular radio communication network and a mobile station.

Another advantage offered by the invention is that it enables interference reductions in a cellular radio communication system.

Yet another advantage afforded by the invention is that, when applied in an interference limited system, such as a system based on Code Division Multiple Access technology, it enables increased system capacity.

The invention will now be described in more detail with reference to exemplary embodiments thereof and also with reference to the accompanying drawings.

DETAILED DESCRIPTION OF THE EMBODIMENTS

Figure 1:
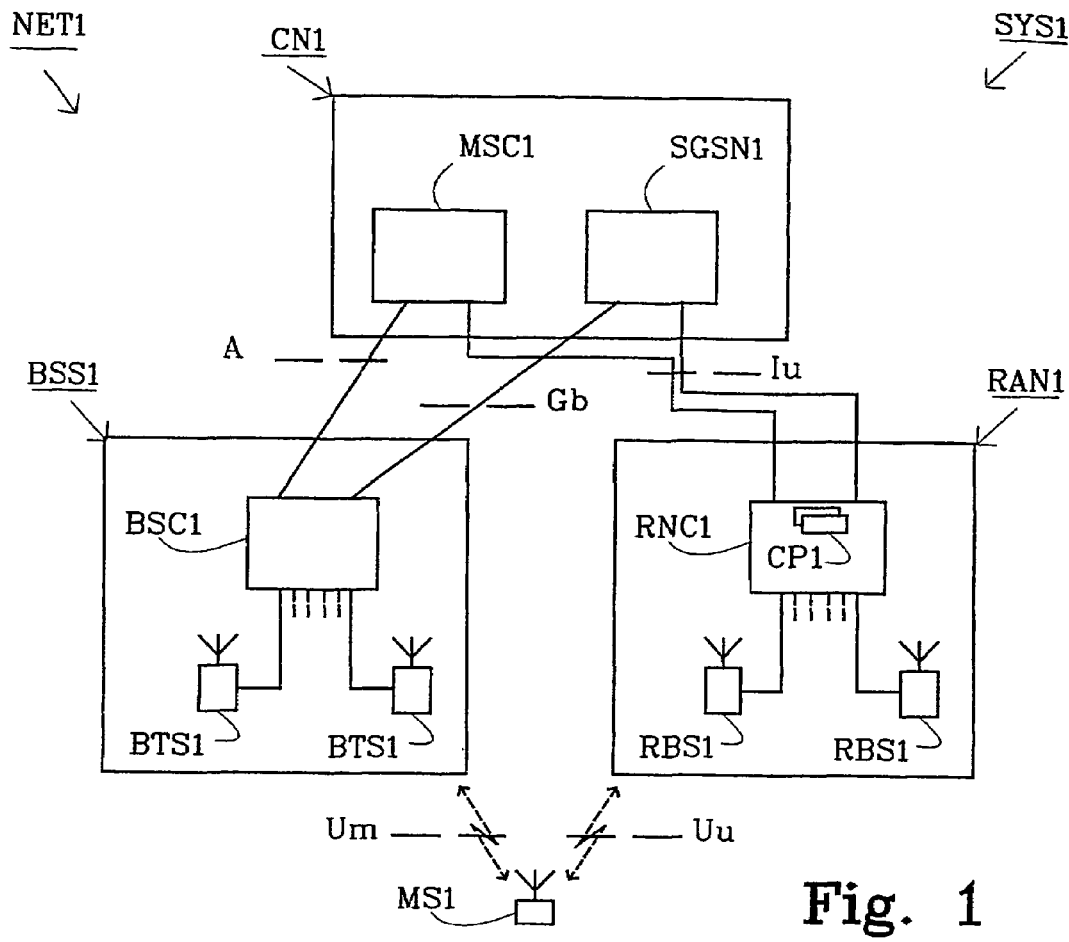
FIG. 1 is a schematic view of a communication system including a cellular radio communication network.

FIG. 1 illustrates a non-limiting example of a communication system SYS1 in which the present invention may be employed. The exemplary communication system SYS1 illustrated in FIG. 1 is a Universal Mobile Telecommunication System (UMTS). The communication system SYS1 includes a cellular radio communication network NET1, alternatively referred to as a Public Land Mobile Network (PLMN), and User Equipment (UE), alternatively referred to as mobile stations (MS).

The exemplary cellular radio communication network includes a core network CN1 and two access networks, a UMTS Terrestrial Radio Access Network (UTRAN) RAN1 and a GSM Base Station System (BSS) BSS1.

The core network CN1 includes a Mobile services Switching Center (MSC) node MSC1 that provides circuit-switched services and a General Packet Radio Service (GPRS) node SGSN1, sometimes referred to as a serving GPRS support node (SGSN), which is tailored to provide packet-switched type services.

The UMTS Terrestrial radio access network RAN1, referred to as radio access network RANL in the following, and the GSM Base Station System, referred to as base station system BSS1 in the following, both provide radio communication between the cellular radio communication network NET1 and mobile stations, such as mobile station MS1 in FIG. 1, but using different radio access technology. Thus the radio access network RAN1 uses the new Wideband Code Division Multiple Access (WCDMA) radio access technology, while the base station system uses GSM/EDGE radio access technology which are both well known to a person skilled in the art.

The radio access network RAN1 includes one or more radio network controllers (RNCs). For sake of simplicity, the radio access network RAN1 of FIG. 1 is shown with only one radio network controller node RNC1. Each radio network controller is connected to and controls a plurality of radio base stations RBS1. The radio access network RAN1 is connected to both core network nodes MSC1 and SGSN1 over a radio access network interface referred to as the Iu interface.

The base station system BSS1 includes one or more base station controllers (BSCs). For sake of simplicity, the base station system BSS1 of FIG. 1 is shown with only one base station controller node BSC1. Each base station controller is connected to and controls a plurality of base transceiver stations (BTSs) BTS1. The base station system BSS1 is connected to the mobile services switching center MSC1 over an interface referred to as the A interface while the base station system BSS1 is connected to the serving GPRS support node SGSN1 over an interface referred to as the Gb interface.

As previously indicated, mobile stations, such as mobile station MS1 shown in FIG. 1, may communicate with the cellular radio communication network NET1 either via the radio access network RAN1 or via the base station system BSS1. Communication between mobile stations and the base station system BSS1 occurs over a radio interface referred to as the Um interface while communication between mobile stations and the radio access network RAN1 occurs over a radio interface referred to as the Uu interface. The details of the Um-interface are specified in the 04- and 05-series of GSM Technical Specifications while the details of the Uu-interface are specified in the 24- and 25-series of UMTS Technical Specifications.

Figure 2A:
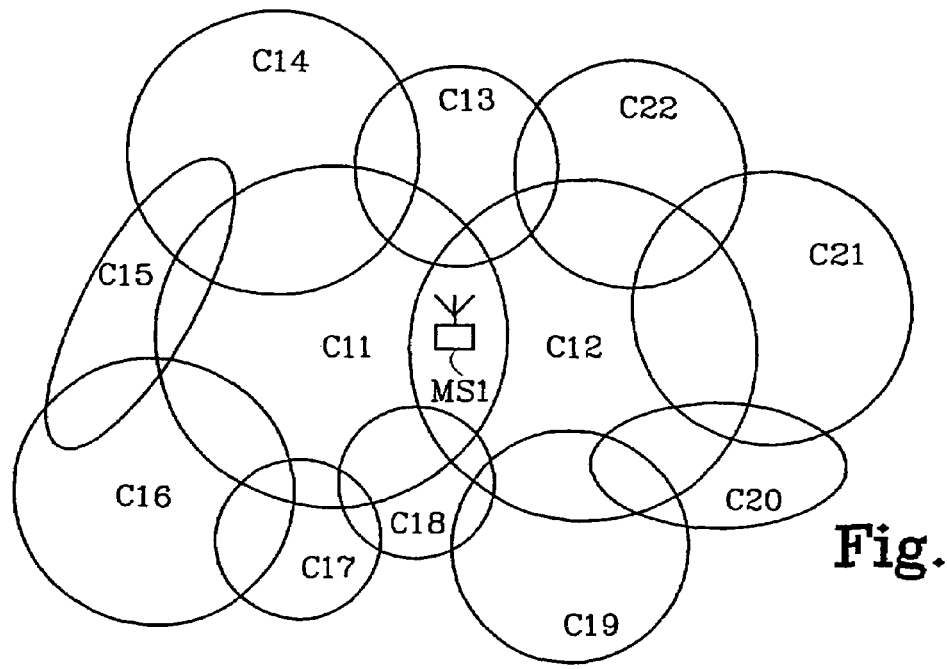
FIG. 2A–2C are views illustrating an example scenario of how cells of the cellular radio communication network provide radio coverage in an area surrounding a mobile station.
Figure 2B:
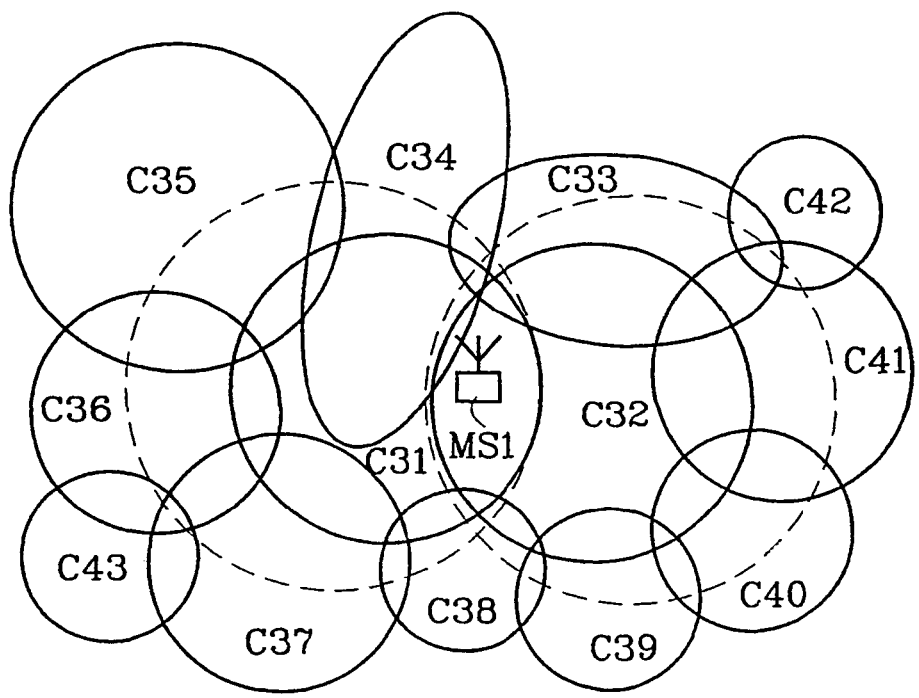
Figure 2C:
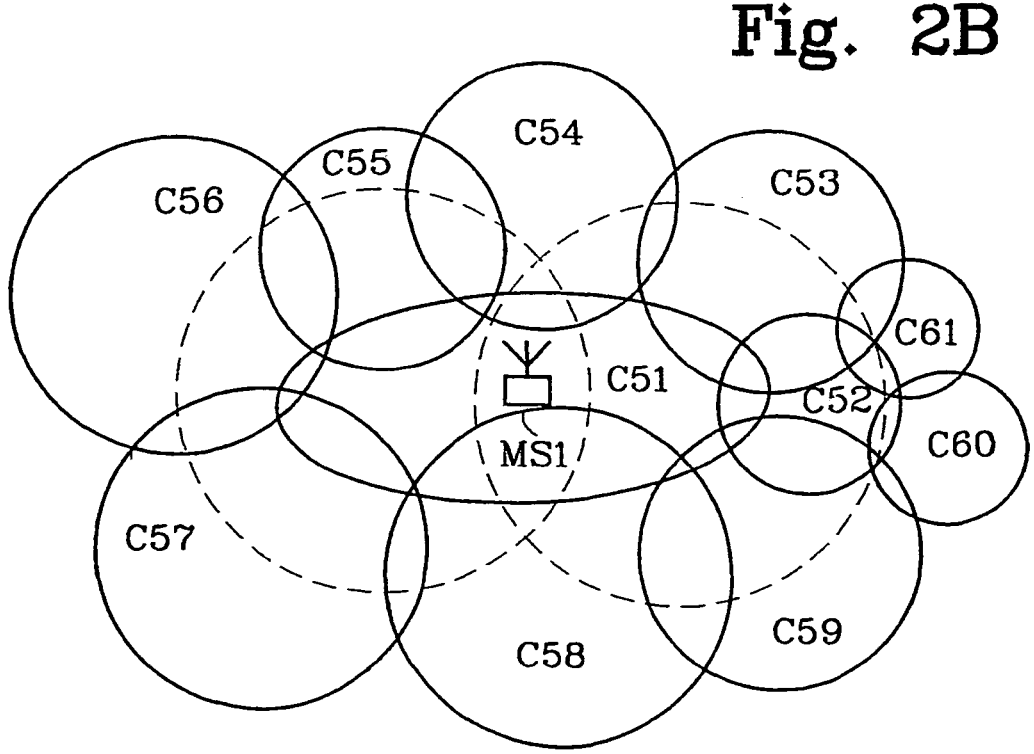

FIG. 2A–2C illustrate an example scenario of how the exemplary cellular radio communication network NET1 provides radio coverage in an geographical area where the mobile station MS1 is currently located. In this example scenario, radio coverage is provided in the geographical area where the mobile station MS1 is located both by the radio access network RAN1 as well as the base station system BSS1. In this example scenario, the radio access network RAN1 operates in the Frequency Division Duplex (FDD) mode of UTRAN and provides radio coverage using cells assigned a first pair of duplex radio frequency (RF) carriers, i.e. an uplink RF carrier and a downlink RF carrier, as well as using cells assigned a second pair of duplex RF carriers. Furthermore, in this example scenario, the base station system BSS1 provides radio coverage using cells assigned uplink and downlink radio carrier frequencies in one of the GSM frequency bands, e.g. the 900 MHZ band.

FIG. 2A illustrates schematically cells C11–C22 of the radio access network RAN1 covering the area where the mobile station MS1 is located using the first pair of duplex radio frequency carriers. As illustrated the cells C11–C22 partly overlap each other and may be of different size as well as different shape.

In similar ways, FIG. 2B illustrates schematically cells C31–C43 of the radio access network RAN1 covering the area where the mobile station MS1 is located using the second pair of duplex radio frequency carriers, and FIG. 2C illustrates schematically cells C51–C61 of the base station system BSS1 covering the same area. In FIG. 2A and FIG. 2B, the geographical cell borders of cells C11 and C12 are illustrated as thin dashed lines.

As illustrated by FIG. 2A to 2C both cell C11 and cell C12 have a plurality of neighbor cells, i.e. cells which are providing radio coverage in areas overlapping cell C11 and cell C12 respectively and cells which are providing radio coverage in areas adjacent to cells C11 and C12 respectively. Thus, cells C12–C18 in FIG. 2A, cells C31–C38 and C43 in FIG. 2B as well as cells C51 and C54–C58 constitute a set of neighbor cells associated with cell C11 while cells C11, C13, and C18–C22 in FIG. 2A, cells C31–C34 and C38–C42 in FIG. 2B as well as cells C51–C54 and C58–C61 in FIG. 2C constitute a set of neighbor cells associated with cell C12.

In the context of the present example scenario, the mobile station MS1 is assumed to be in a state of active communication with the cellular network NET1 using a dedicated radio communication channel supported by an active set consisting of cells C11 and C12. It is further assumed that the mobile station MS1 is capable of communicating both according to the Um interface, i.e. using the GSM air interface, as well as according to the Uu interface, i.e. using the UTRAN FDD mode air interface.

As previously discussed, the mobile station MS1 need to perform downlink radio transmission measurements for the purpose of supporting handover. Thus the radio access network RAN1 orders the mobile station MS1 to perform measurements on downlink radio transmissions in the cells of the active set, i.e. cells C11 and C12 in the present example scenario, as well as in the cells of a so called monitored set comprising neighbor cells to the cells in the active set, i.e. cells which are likely to become targets for handover in the future.

If the mobile station MS1 were to perform downlink measurements for cells C11 and C12 in the active set as well as all neighbor cells to cells C11–C12, the mobile station MS1 would need to perform measurements for all cells illustrated in FIG. 2A and FIG. 2B, i.e. a total of 36 cells.

The current specifications for UTRAN FDD mode (see 3GPP technical specification 25.331) allows a radio access network to order measurement of downlink transmissions in upto 32 cells each of cells operating at the same downlink frequency as the cells of the active set (Intra-frequency measurements), cells operating at downlink frequencies that differ from the frequency of the cells in the active set (Inter-frequency measurements) and cells using another Radio Access Technology (Inter-RAT measurements). Thus a mobile station may be ordered to perform downlink transmission measurements for a total of 96 cells.

The capacity for performing downlink transmission measurements may vary from mobile station to mobile station, but may in many instances be significantly less than 32 cells each for Intra-frequency, Inter-Frequency and Inter-RAT measurements, e.g. in the order of 8–10 cells for each different category, i.e. a total of 24–30 cells. If a mobile station is ordered to perform too many downlink transmission measurements, the rate at which the mobile station will be able to report measurement results to the radio access network will be severely reduced and may thus result in a significant delay before handover to change a current active set to a more suitable active set can be performed. This in turn causes increased interference levels due to radio communication between the mobile station and the radio access network occurring using unnecessarily high transmission power levels. The delayed handover may also result in a loss of communication in a situation where the radio environment changes very quickly. In order to eliminate or at least reduce the risk for ordering a mobile station to perform downlink transmission measurements in excess of its capacity, configuration parameters may be provided in a radio access network enabling operation and maintenance personnel to control the maximum number of downlink transmission measurements in each category that the radio access network is allowed to order mobile stations to perform.

Assuming in the present example scenario that configuration parameters in the radio access network RNC1 specifies a maximum of 8 cells each for Intra-frequency, Inter-Frequency and Inter-RAT downlink transmission measurements, i.e. a total of 24 cells, the mobile station MS1 can not be ordered to perform downlink transmission measurements for all neighbor cells to cells C11 and C12 in the current active set.

In current UMTS Radio Access Networks, a known way of handling a situation where there are too many neighbor cells associated with an Active Set supporting communication between a mobile station and the radio access network, is to order the mobile station to perform measurements on an arbitrary selection of said neighbor cells. However, since only an arbitrary selection of all neighbor cells are measured, there is a significant risk that the most suitable cell, i.e. the cell where communication between the mobile station and the radio access network can be maintained using minimum radio transmission power levels, is never considered as a candidate for handover. Not using the most suitable cell for radio communication between the radio access network and the mobile station means that said radio communication occurs using unnecessarily high transmission power levels, which causes increased interference. The increased interference in turn translates to reduced system capacity.

The present invention deals with situations as the one illustrated in the example scenario above by providing conditions for increasing the probability that the most suitable cells are included in an Active Set supporting communication between a cellular radio communication network and a mobile station when the capacity for performing downlink radio transmission measurements is limited.

The present invention solves the above stated problem by a method for ranking neighbor cells and a method for controlling measurements performed by a mobile station which accounts for the established ranking of neighbor cells. The invention also includes an apparatus for ranking neighbor cells and a cellular radio communication network including such an apparatus.

Figure 3A:
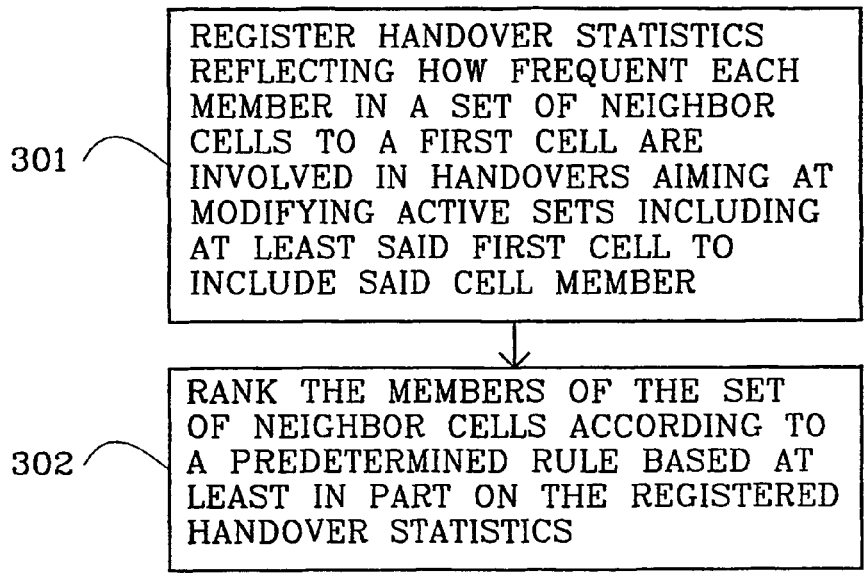
FIG. 3A is a flow chart illustrating a basic method according to the invention for ranking.

FIG. 3A illustrates a basic method according to the invention for ranking a set of neighbor cells registered in a cellular radio communication network as neighbor cells to a first cell of the cellular radio communication network.

For each cell member in said neighbor cell set, handover statistics on how frequent said cell member is involved in handovers aiming at modifying active sets including at least said first cell to include said cell member is registered at step 301.

At step 302 ranking of said set of neighbor cells is performed according to a predetermined rule based at least in part on the registered handover statistics for the different cell members in the set of neighbor cells.

Figure 3B:
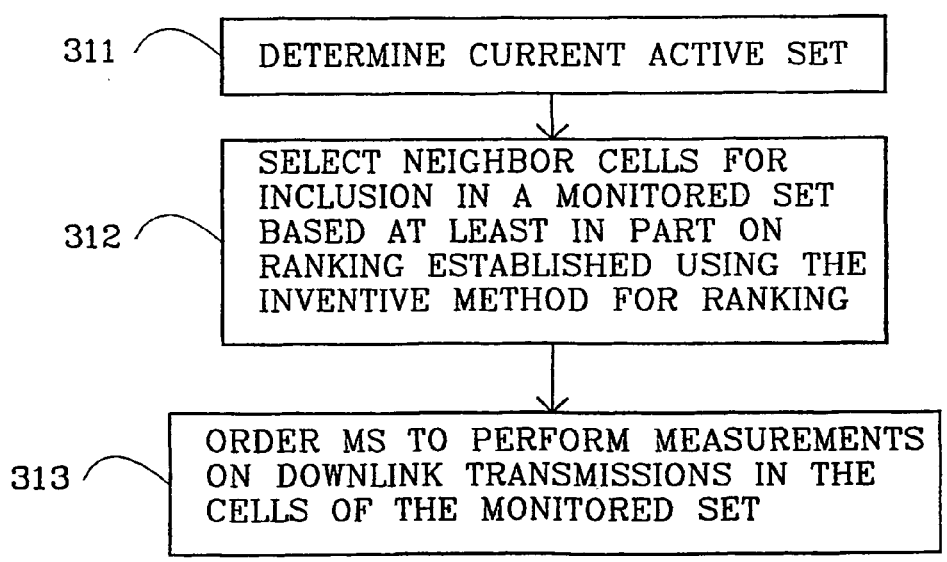
FIG. 3B is a flow chart illustrating a basic method according to the invention for controlling mobile station measurements.

FIG. 3B illustrates a basic method according to the invention for controlling measurements performed by a mobile station operating within an area served by a cellular radio communication network.

At step 311 a current active set of one or more cells providing radio communication between the mobile station and the cellular radio communication network is determined.

At step 312 neighbor cells to the cells in the current active set are selected for inclusion in a monitored set of cells. The selection of neighbor cells for inclusion in the monitored set is based at least in part on ranking of the neighbor cells of the current active set established using the inventive method for ranking neighbor cell sets.

At step 313 the cellular radio communication network orders the mobile station to perform measurements on downlink transmissions in the cells of the monitored set.

Figure 4:
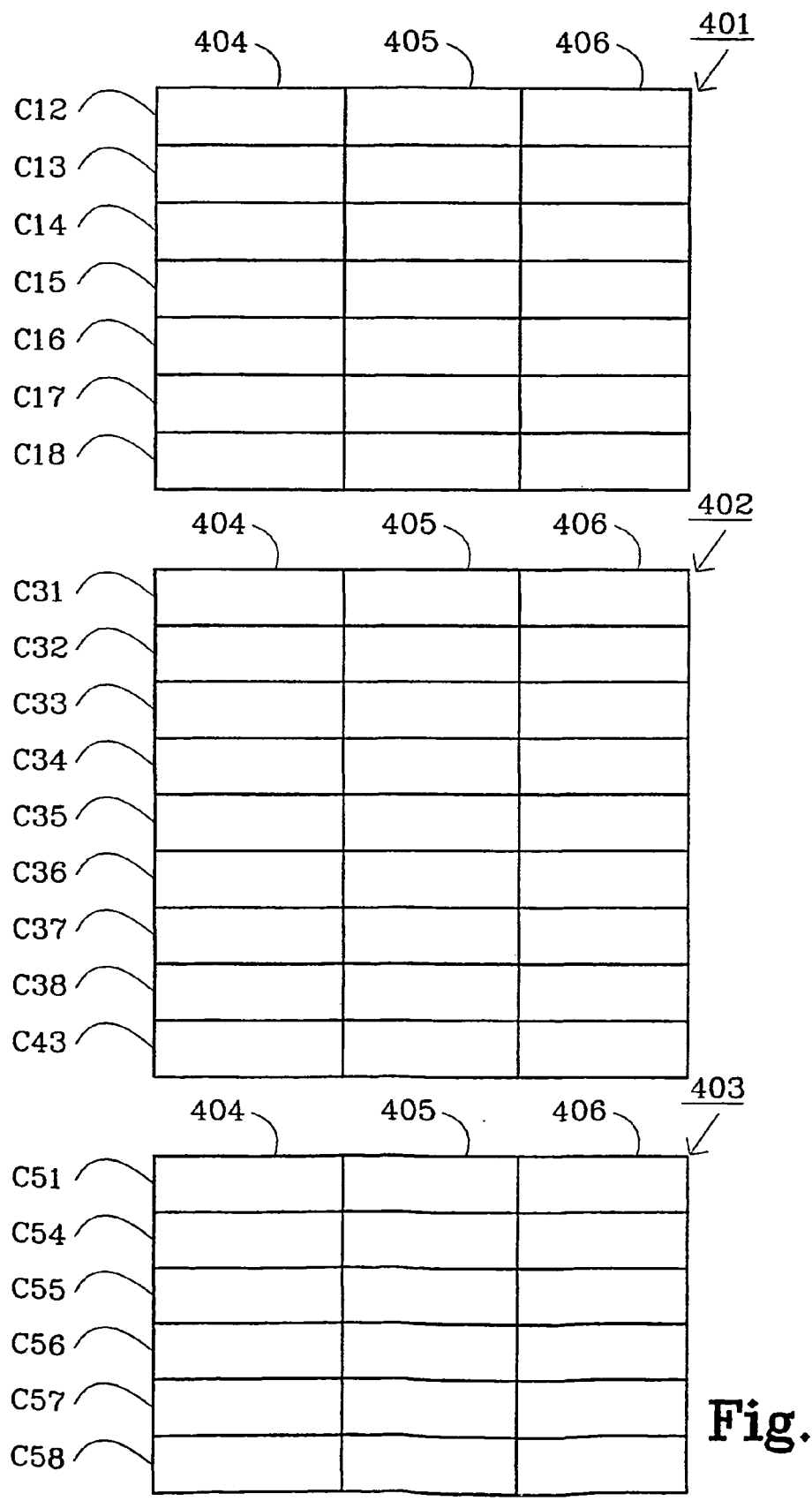
FIG. 4 is a block diagram illustrating an example data structure for storing neighbor cell data.
Figure 5:
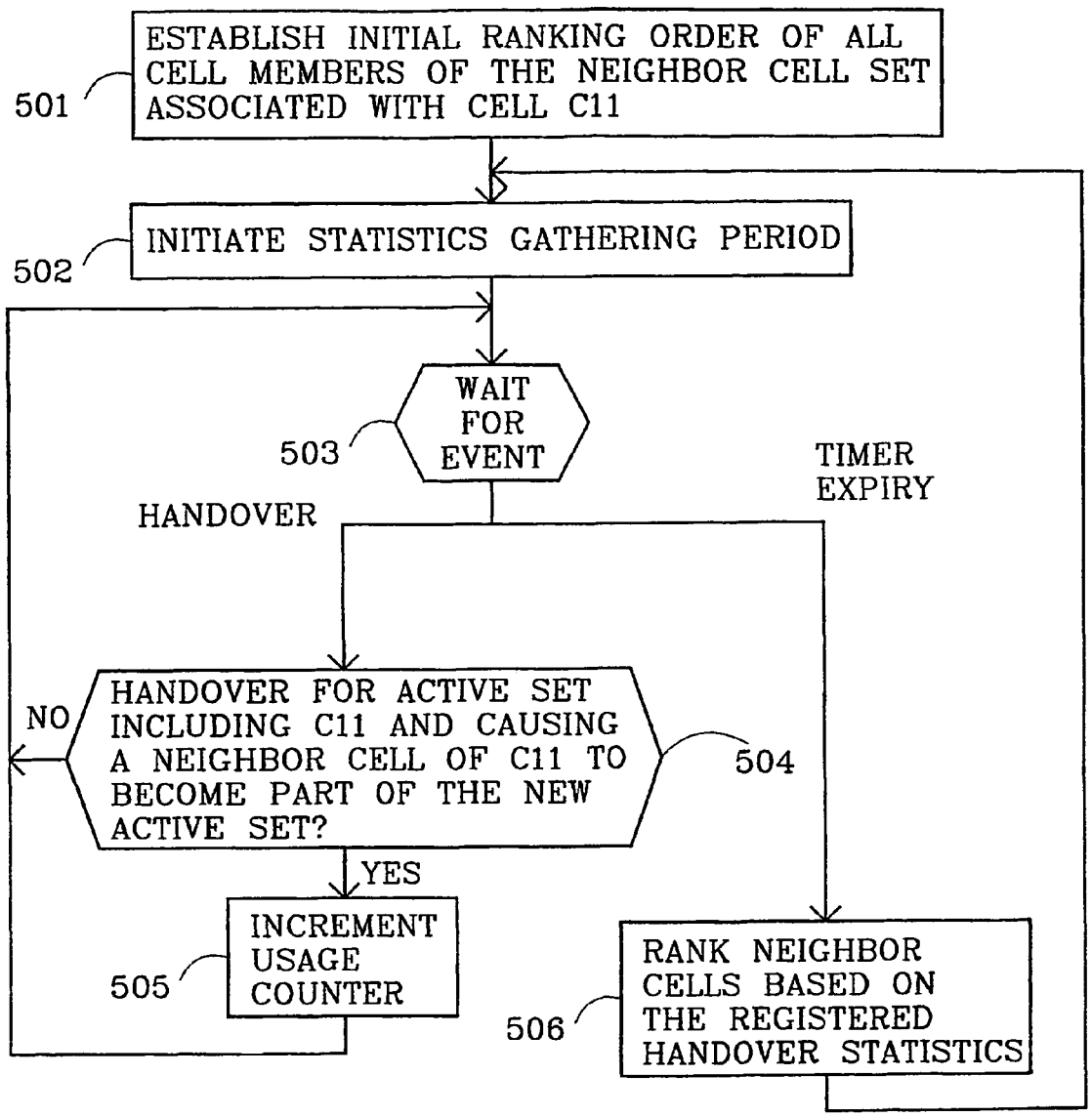
FIG. 5 is a flow chart illustrating a first exemplary method according to the invention for ranking.

FIGS. 4 and 5 illustrates a first exemplary embodiment of the invention for ranking implemented in the radio access network RAN1 in FIG. 1.

FIG. 4 illustrates an exemplary data structure in the radio network controller RNC1 for storing neighbor cell data. In FIG. 4, the exemplary data structure 400 is used for storing data associated with the neighbor cells of cell C11 in FIG. 2A.

The data structure 400 includes three tables:
a first table 401 for storing data associated with neighbor cells using the same first pair of duplex radio frequency carriers as cell C11, i.e. cells C12–C18 in FIG. 2A;
a second table 402 for storing data associated with neighbor cells using the second pair of duplex radio frequency carriers, i.e. cells C31–C38 and C43 in FIG. 2B;
a third table 403 for storing data associated with neighbor cells of the base station system BSS1, i.e. cells C51 and C54–C58.

The three tables 401–403 represent a division of the total set of neighbor cells to cell C11 into three subset of neighbor cells. In the following the subset represented by table 401 will be referred to as intra-frequency neighbors, the subset represented by table 402 will be referred to as inter-frequency neighbors and the subset represented by table 403 will be referred to as inter-RAT neighbors.

For each neighbor cell registered in the tables 401–403 a cell identity field 404, a rank field 405 and a usage counter field 406 are provided.

The cell identity field 404 is used to identify each neighbor cell and is also used as a key to access additional information about each neighbor cell that is necessary for ordering downlink transmission power measurements. This additional information about each neighbor cell is stored in other data structures in the radio network controller RNC1 and includes scrambling codes for each intra-frequency neighbor cell registered in the first table 401, scrambling code and carrier frequency for each inter-frequency neighbor cell registered in the second table 402 and Broadcast Control Channel (BCCH) carrier frequency and Base Transceiver Station Identity Code (BSIC) for each inter-RAT neighbor cell registered in the third table 403.

The rank field 405 specifies the rank assigned to respective neighbor cell member.

The usage counter field 406 is used to register handover statistics for the respective neighbor cell member.

FIG. 5 illustrates processing steps performed in the radio network controller RNC1 in accordance with the first exemplary embodiment of the invention for ranking the members of the set of neighbor cells associated with cell C11.

At step 501 an initial arbitrary ranking order of all cell members of the neighbor cell set associated with cell C11 is established. This arbitrary order may e.g. correspond to the order by which neighbor cells have been added to the respective tables 401–403. The initial ranking, and all subsequent rankings, are performed on each table 401–403 separately, i.e. each subset of neighbor cells is ranked separately. The rank field 405 of all neighbor cells registered in tables 401–403 are set according to the initial ranking order.

At step 502 a statistics gathering period is initiated by setting a timer to a selected time period value and initiating all usage counter fields 406 in the tables 401–403 to a count of zero. The timer value is defined by a configuration parameter enabling operation and maintenance personnel to control the statistics gathering period length. Typically the timer value would be selected as e.g. 24 hours.

During the statistics gathering period, processing is controlled by two types of events, handovers and timer expiry. The radio network controller RNC1 awaits these events at step 503.

Each time a handover event (an alternative HANDOVER at step 503) is detected at step 503, the radio network controller RNC1 determines at step 504 whether the handover occurred for an original active set including at least cell C11 and also whether the handover was a handover causing one of the neighbor cells of C11 to become part of the new active set. If both these conditions are fulfilled (an alternative YES at step 504), processing continues at step 505 where the usage counter 406 associated with the neighbor cell member included in the new active set is incremented by one. Processing then returns to step 503. Otherwise (an alternative NO at step 504), i.e. when both conditions of step 504 are not fulfilled, processing returns directly to step 503.

Upon timer expiry (an alternative TIMER EXPIRY at step 503), i.e. when the statistics gathering period has come to an end, the radio network controller RNC1 proceeds at step 506 by ranking the neighbor cells to cell C11 based on the registered handover statistics, i.e. the value of the usage counter fields 406 in tables 401–403, for each neighbor cell to cell C11.

As previously indicated, ranking is performed separately for each table 401–403 and is performed as follows.

A tentative ranking is first determined based strictly on the number of times each cell member has been involved in handovers as determined by the respective usage counters 406. For cell members involved in the same number of handovers, the relative ranking order established last time step 506 was performed is maintained.

The tentative ranking order is then adjusted to arrive at a new ranking order by assigning the highest rank to the cell member that was assigned the lowest rank according to the tentative ranking and ranking all other cell members one step lower than according to the tentative ranking.

Processing then continues at step 502, where a new statistics gathering period is initiated and processing continues as described above.

In the first exemplary embodiment of the invention, one or more control processors CP1 in the radio network controller RNC1 of FIG. 1 are programmed to perform all the processing associated with the method illustrated in FIG. 5. Thus the radio network controller RNC1 can be regarded as an apparatus for ranking the neighbor set cell members and the control processors CP1 functions both as handover statistics gathering circuitry as well as ranking circuitry for ranking the neighbor set cell members based on the gathered handover statistics.

Figure 6:
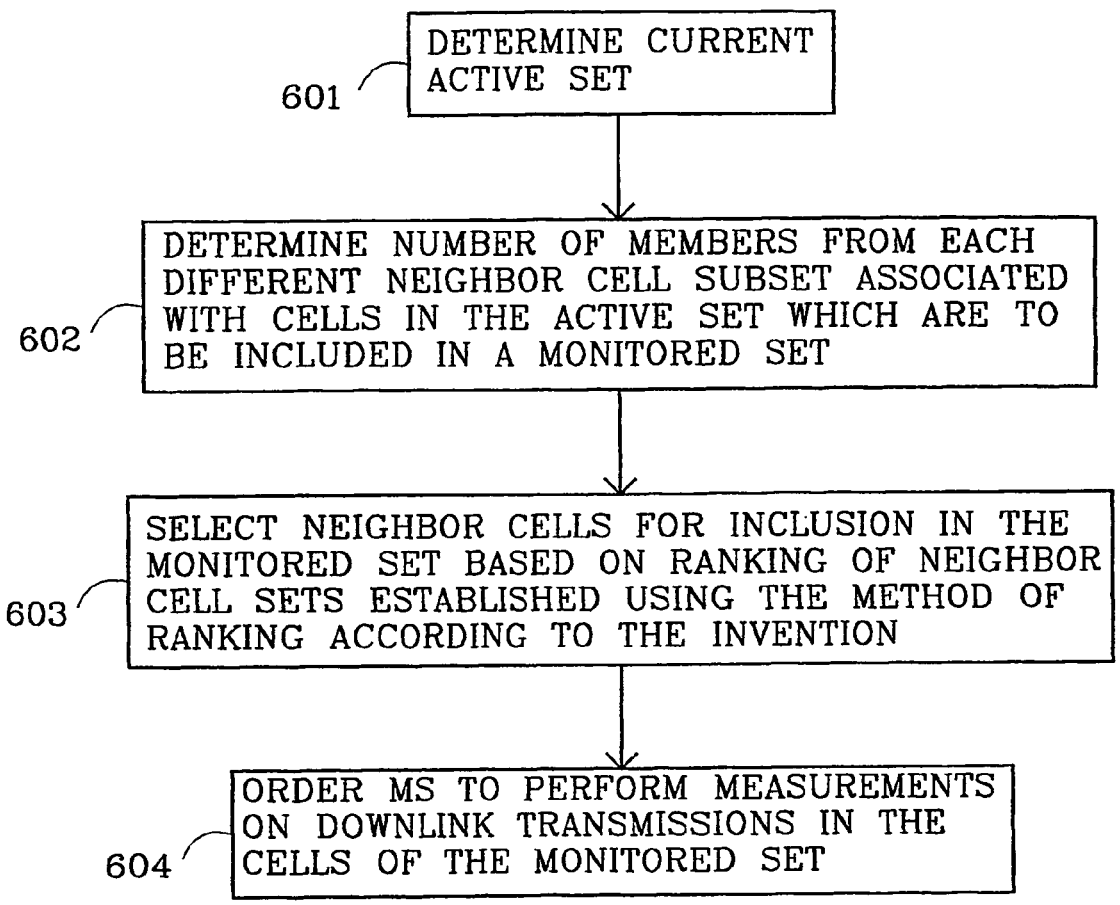
FIG. 6 is a flow chart illustrating a first exemplary method according to the invention for controlling mobile station measurements.

FIG. 6 illustrates a first exemplary embodiment of the invention for controlling downlink transmission measurements performed by a mobile station, e.g. mobile station MS1, operating in the area served by radio access network RAN1 in FIG. 1. The method is illustrated by means of the previously used example scenario, wherein the mobile station MS1 is in communication with the radio access network RAN1 using a current active set consisting of cells C11 and C12.

At step 601 the current active set, e.g. cells C11 and C12, providing radio communication between the mobile station MS1 and the radio access network RAN1 is determined.

At step 602 the number of neighbor cells from each different neighbor cell subset associated with the cells in the active set, i.e. cells C11 and C12, to be included in a monitored set are determined. For each different subset category, i.e. Intra-frequency, Inter-frequency and Inter-RAT neighbor cells respectively, each cell in the active set is allowed, as far as possible, to contribute with an equal number of neighbor cells. Since, as previously described, we assume that in the present example scenario, configuration parameters of the radio access network RAN1 specifies a maximum of 8 cells each for Intra-frequency, Inter-frequency and Inter-RAT downlink measurements, and the current active set comprises cells C11 and C12, a total of 6 Intra-frequency neighbor cells, 8 Inter-frequency neighbor cells and 8 Inter-RAT neighbor cells are allowed in the monitored set. Thus, the active set cells C11 and C12 may each contribute with 3 Intra-frequency, 4 Inter-frequency and 4 Inter-RAT neighbor cells to the monitored set.

At step 603 neighbor cells to the cells in the current active set are selected for inclusion in the monitored set of cells. The selection of neighbor cells is based on ranking of the sets of neighbor cells associated with cell C11 and C12 respectively which are established using the above described exemplary first embodiment of the invention for ranking. The highest ranked cells in each neighbor cell subset associated with the active set cells C11 and C12 are selected. Thus, among the neighbor cells associated with cell C11, the cell members ranked as the top three Intra-Frequency neighbor cells, the cell members ranked as the top four Inter-Frequency neighbor cells and the cell members ranked as the top four Inter-RAT neighbor cells, are selected for inclusion in the monitored set. Similarly, among the neighbor cells associated with cell C12, the cell members ranked as the top three Intra-Frequency neighbor cells, the cell members ranked as the top four Inter-Frequency neighbor cells and the cell members ranked as the top four Inter-RAT neighbor cells, are selected for inclusion in the monitored set. In the event that a neighbor cell associated with both cells C11 and C12, i.e. a common neighbor cell, is selected twice, i.e. both as a highly ranked neighbor cell to C11 as well as a highly ranked neighbor cell to C12, an additional neighbor cell to either cell C11 or cell C12 of the same subset category as the common neighbor cell may be selected. Preferably this additional cell is selected such that, as far as possible, the monitored set includes, for each different category of neighbor cells, an equal number of neighbor cells associated with cells C11 and C12 respectively.

At step 604 the radio access network RAN1 orders the mobile station MS1 to perform measurements on downlink transmissions in the cells of the monitored set.

Apart from the above disclosed exemplary first embodiments of methods according to the invention for ranking neighbor cells and controlling mobile station down link measurements, there are several ways of providing rearrangements, modifications and substitutions of the first embodiments resulting in additional embodiments of the invention.

In the example scenario illustrated in FIG. 2A–2C, GSM/EDGE radio access technology is used in cells C51–C54 defined as neighbor cells to cells C11 and C12 in which UTRAN FDD mode is used. It is of course possible for a first cell in an UMTS radio access network, or any other type of radio access network, to have neighbor cells using one or more other radio access technologies than that used in the first cell. Thus, cells C11 and C12 in FIG. 2A could instead of or in addition to cells C51–C54 in which GSM/EDGE radio access technology is used, have neighbor cells in which e.g. Personal Digital Cellular (PDC), Digital Advanced Mobile Phone System (DAMPS) or CDMA2000 radio access technology is used.

Instead of defining the statistics gathering period as lasting for a predetermined time period, the statistics gathering period could alternatively be defined as lasting until the total number of increments of all usage counters associated with a set of neighbor cells to a first cell exceeds a predetermined threshold. Thus, dependent on how frequent handover occurs, the statistics gathering period may last for a longer or shorter time period. The statistics gathering period length could also be defined based on a combination of an absolute time period and the total number of increments of the usage counters associated with the set of neighbor cells. Thus, the statistics gathering period could e.g. be defined as lasting a certain minimum period of time but not ending before a certain total number of increments of the usage counters associated with the set of neighbor cells exceeds a predetermined threshold value.

Instead of only including successful handovers in the handover statistics gathered for each cell member, i.e. only incrementing the usage counter associated with a cell member when indeed establishment of communication in the cell member was successful, handover attempts, regardless of whether the handover was successful or not, could be included in the handover statistics for each cell member.

Instead of organizing the set of neighbor cells of a first cell into at least two subsets and ranking each subset separately, the total set of neighbor cells associated with the first cell could be ranked. Ranking the total set of neighbor cells to a cell in a single ranking order would typically be performed in a situation where e.g. there are no Inter-frequency or Intra-RAT neighbors to the first cell. Ranking the total set of neighbor cells in a single ranking order could however also be performed in a situation where there are different categories of neighbor cells.

Different rules can be applied when ranking the members of a neighbor cell set of a first cell based on handover statistics reflecting how frequent each cell member is involved in handovers aiming at modifying active sets including at least the first cell to include said cell member. Typically however, cell members for which the registered handover statistics indicate frequent involvement in handovers are generally ranked higher than cell members for which the registered handover statistics indicate less frequent involvement in handovers. When performing repeated cycles of gathering handover statistics and ranking the cell members based on said statistics, a probing mechanism may be implemented by, at least in some of the repeated ranking instances, ranking at least a first cell member higher than at least one other cell member more frequently involved in handovers than the at least first cell member. The probing mechanism is a way of offsetting the bias caused by the fact that neighbor cells which are never or only seldom included in monitored sets, stand a lesser chance of being considered for handover than neighbor cells that are often selected for inclusion. The first exemplary embodiment of a method for ranking disclosed above, provides one example of such a probing mechanism, wherein for each ranking instance, the cell member assigned the lowest rank in the tentative ranking, i.e. the cell member which according to the registered handover statistics is least frequently involved in handovers, is assigned the highest rank.

In the above illustrated example scenario, as in most cases, a single radio network controller, e.g. radio network controller RNC1, is involved when communicating with mobile stations. However, in a situation where two radio network controllers, i.e. both a serving radio network controller and a drift radio network controller is involved in supporting communication with mobile stations, some complications arise due to the functional split between the two radio network controllers. The serving radio network controller is responsible for issuing measurement orders to mobile stations and ordering handovers, while the drift radio network controller is in control of the resources of radio base stations and cells for which the drift radio network controller acts as controlling radio network controller. The serving radio network controller and the drift radio network controller interacts over the so called Iur interface.

When ordering the drift radio network controller to establish radio communication in cells under the control of the drift radio network controller by issuing a Radio Link Setup Request or Radio Link Addition Request message from the serving radio network controller to the drift radio network controller, the current Radio Link Setup Response and Radio Link Addition Response messages returned as acknowledgment from the drift radio network controller to the serving radio network controller includes information on which cells constitute neighbor cells to the cells in which communication have been established. In order to enable the serving radio network controller to take account of ranking of neighbor cell sets associated with cells under the control of the drift radio network controller, the serving radio network controller needs to be provided with information indicating said ranking. A simple way of providing the ranking information from the drift radio network controller to the serving radio network controller would be to require the drift radio network controller to list said neighbor cells in ranking order in the Radio Link Setup Response and Radio Link Addition Response messages respectively. Another problem is that it may be difficult for the drift radio network controller to ensure that usage counters of neighbor cell set members are stepped each time handovers are initiated by the serving radio network controller and affecting said neighbor cell set members. This problem may of course e.g. be solved by providing signals from the serving radio network controller to the drift network controller indicating when handovers affecting said cell members are ordered. Another alternative, would be to simply accept that not all handovers are registered for neighbor cell members on the border between the serving and the drift radio network controller.

In yet another alternative embodiment of the invention, an operation and maintenance node, e.g. a Radio Access Network Operation Support (RANOS) node from Ericsson, may be responsible for gathering handover statistics of neighbor cell sets and establishing ranking for cell members of said neighbor cell sets. In this alternative embodiment, the radio network controller, or plural radio network controllers, of a radio access network, would report all handover attempts and/or successful handovers to the operation and maintenance node, indicating which cells were involved in the original active set and which cells were the target for handover. Using this information, the operation and maintenance node could assemble statistics on how often neighbor cells associated with a certain cell are involved in handovers from active sets including at least said certain cell. The operation and maintenance node could perform ranking of neighbor cell sets based on the established handover statistics and update the radio network controller, or plural radio network controllers, of the ranking of neighbor cell sets associated with cells under the control of respective radio network controller. Preferably, in order to reduce the load on the interface between radio network controllers and the operation and maintenance node, each radio network controller gathers information on a plurality of performed handovers before reporting said handovers to the operation and maintenance node. This alternative embodiment resolves the problem of updating handover usage counters for neighbor cell sets on the border between two radio network controllers.

According to still another embodiment of the invention, mobile stations could be ordered to perform downlink measurements on monitored sets including random selections of the neighbor cells associated with cells in the respective active set for a defined statistics gathering period. During this statistics gathering period, handover statistics could be registered for each neighbor cell as previously described. Upon completion of the statistics gathering period, the neighbor cells could be ranked based upon the registered handover statistics after which mobile stations could be ordered to perform downlink measurements on monitored sets including neighbor cells selected based on said ranking.

In embodiments of the invention implemented in cellular radio communication networks, such as GSM networks, not supporting macrodiversity/soft handover, the active set supporting communication between the network and a mobile station always includes one cell, i.e. the serving cell.

As a person skilled in the art appreciates, application of the invention is in no way limited to only cellular radio communication networks conforming to the UMTS specifications. The invention is generally applicable to all cellular systems in which the cellular radio communication network orders mobile stations to perform downlink measurements on transmissions in neighbor cells to the cells currently serving said mobile stations. Thus, the invention is also applicable in cellular radio communication networks adhering to e.g. GSM, PDC, TIA/EIA-136 and CDMA2000 specifications.

What is claimed is:

1. A method in a cellular radio communication network for ranking cell members of a set of neighbor cells registered in the cellular radio communication network as neighbor cells to a first cell of the cellular radio communication network, the method comprising the steps of:
    registering, for each cell member in said neighbor cell set, handover statistics reflecting how frequent said cell member is involved in a handover, and
    ranking cell members of said set of neighbor cells according to a predetermined rule based at least in part on the registered handover statistics for the different cell members in the set of neighbor cells,
    wherein prior to performing the ranking step, handover statistics are registered for a defined statistics gathering period, and
    wherein each cell member in the set of neighbor cells is associated with an individual usage counter and said registering step is performed, for the defined statistics gathering period, by incrementing the respective individual usage counter when the corresponding cell member is involved in a handover.

2. A method according to claim 1, wherein the statistics gathering period lasts for a predetermined time period.

3. A method according to claim 1, wherein the statistics gathering period lasts until the total number of increments of all usage counters during the statistics gathering period exceeds a predetermined threshold.

4. A method according to claim 1, wherein the length of the statistics gathering period is defined by a combination of an absolute time period and the total number of increments of all usage counters during the statistics gathering period.

5. A method according to claim 1, wherein the statistics gathering period lasts until both the total number of increments of all usage counters during the statistics gathering period exceeds a predetermined threshold and at least a predetermined minimum time period has passed since the statistics gathering period begun.

6. A method according to claim 1, wherein only successful handovers are included in the handover statistics for each cell member.

7. A method according to claim 1, wherein handover attempts, regardless of whether the handover was successful or not, are included in the handover statistics for each cell member.

8. A method according to claim 1, wherein the registering and ranking steps are performed repeatedly.

9. A method according to claim 1, wherein according to said predetermined rule, cell members for which the registered handover statistics indicate frequent involvement in handovers are generally ranked higher than cell members for which the registered handover statistics indicate less frequent involvement in handovers.

10. A method according to claim 8, wherein according to said predetermined rule, cell members for which the registered handover statistics indicate frequent involvement in handovers are generally ranked higher than cell members for which the registered handover statistics indicate less frequent involvement in handovers while in at least some of the repeated ranking instances, at least a first cell member is ranked higher than at least one other cell member more frequently involved in handovers than the at least first cell member.

11. A method according to claim 10, wherein the at least first cell member is a single cell member which according to the registered handover statistics is least frequently involved in handovers and wherein said single cell member is assigned the highest rank.

12. A method according to claim 1, wherein the set of neighbor cells is organized into at least two subsets of neighbor cells and wherein when performing said ranking, each subset is ranked separately.

13. A method according to claim 12, wherein said at least two subsets include any combination of:
    a subset of neighbor cells in the same frequency band as the first cell;
    a subset of neighbor cells in a different frequency band than the first cell;
    a subset of neighbor cells in which a radio access technology different from the radio access technology of the first cell is used.

14. A method according to claim 12, wherein the first cell is a cell in which radio communication occurs using a Code Division Multiple Access based technology and wherein said at least two subsets include any combination of:
    a subset of neighbor cells using the same downlink frequency as the first cell;
    a subset of neighbor cells using downlink frequencies different from that of the first cell;

a subset of neighbor cells in which a radio access technology different from the radio access technology of the first cell is used.

15. A method in a cellular radio communication network for controlling measurements performed by a mobile station operating within an area served by the cellular radio communication network, the method comprising the steps of:
  determining a current active set of one or more cells providing radio communication between the mobile station and the cellular radio communication network;
  selecting neighbor cells to the cells in the current active set for inclusion in a monitored set of cells;
  ordering the mobile station to perform measurements on downlink transmissions in the cells of the monitored set,
  wherein neighbor cells of the cells in the current active set are ranked using a method according to claim 1 and wherein said selection of neighbor cells for inclusion in the monitored set is based at least in part on said ranking.

16. An apparatus in a cellular radio communication network for ranking cell members of a set of neighbor cells registered in the cellular radio communication network as neighbor cells to a first cell of the cellular radio communication network, the apparatus including:
  handover statistics gathering circuitry adapted to register for each cell member in the set of neighbor cells, handover statistics reflecting how frequent said cell member is involved in a handover;
  ranking circuitry adapted to rank cell members of said set of neighbor cells according to a predetermined rule based at least in part on the registered handover statistics for the different cell members in the set of neighbor cells,
  wherein prior to the ranking circuitry ranking the cell members of the neighbor cells, the handover statistics gathering circuitry registers handover statistics for a defined statistics gathering period, and
  wherein the handover statistics gathering circuitry includes an individual usage counter for each cell member in the set of neighbor cells, and wherein the handover statistics gathering circuitry is adapted, for the defined statistics gathering period, to increment the respective individual usage counter upon detecting the corresponding cell member being involved in a handover.

17. An apparatus according to claim 16, wherein the statistics gathering period lasts for a predetermined time period.

18. An apparatus according to claim 16, wherein the statistics gathering period lasts until the total number of increments of all usage counters during the statistics gathering period exceeds a predetermined threshold.

19. An apparatus according to claim 16, wherein the length of the statistics gathering period is defined by a combination of an absolute time period and the total number of increments of all usage counters during the statistics gathering period.

20. An apparatus according to claim 16, wherein the statistics gathering period lasts until both the total number of increments of all usage counters during the statistics gathering period exceeds a predetermined threshold and at least a predetermined minimum time period has passed since the statistics gathering period begun.

21. An apparatus according to claim 16, wherein the handover statistics gathering circuitry is adapted to include only successful handovers in the handover statistics for each cell member.

22. An apparatus according to claim 16, wherein the handover statistics gathering circuitry is adapted to include handover attempts, regardless of whether the handover was successful or not, in the handover statistics for each cell member.

23. An apparatus according to according to claim 16, wherein according to said predetermined rule, cell members for which the registered handover statistics indicate frequent involvement in handovers are generally ranked higher than cell members for which the registered handover statistics indicate less frequent involvement in handovers.

24. An apparatus according to claim 16, wherein the set of neighbor cells is organized into at least two subsets of neighbor cells and wherein the ranking circuitry is adapted to rank each subset separately.

25. A cellular radio communication network including an apparatus according to claim 16.

26. An apparatus according to claim 16, further comprising:
  means for selecting at least one cell member for inclusion in an active set including the first cell.

27. A method according to claim 1, wherein the registering and ranking steps permit evaluation of whether to include at least one cell member in an active set including the first cell.

* * * * *